C. Perley,
School Seat.
Nº 24,151.  Patented May 24, 1859.
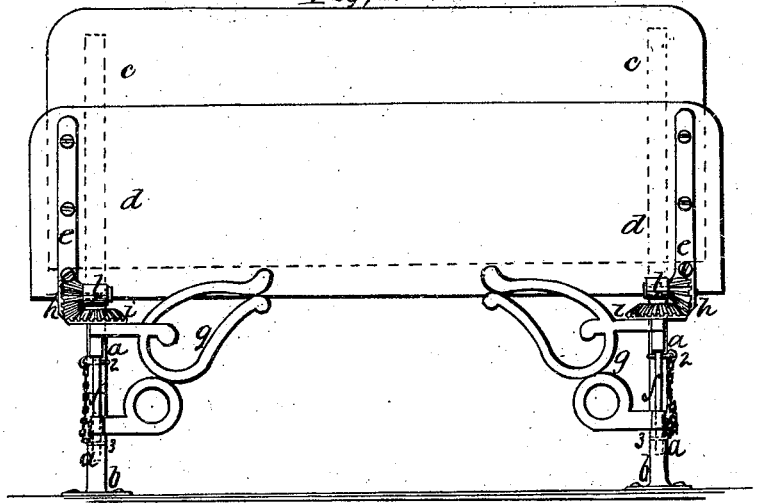
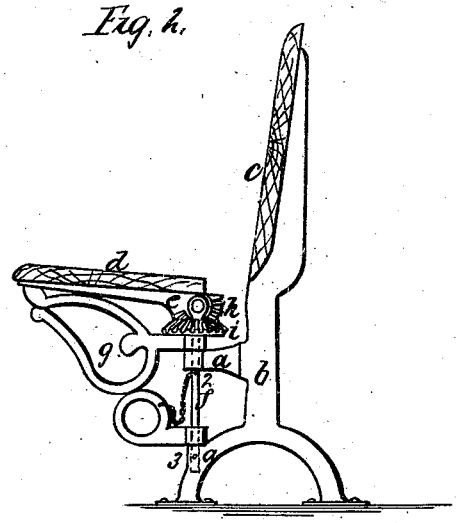
Witnesses,
Lemuel W. Serrell
Thomas B. Harold
Inventor,
Charles Perley

UNITED STATES PATENT OFFICE.

CHARLES PERLEY, OF NEW YORK, N. Y.

SEAT FOR CHURCHES, SCHOOLS, &c.

Specification of Letters Patent No. 24,151, dated May 24, 1859.

*To all whom it may concern:*

Be it known that I, CHARLES PERLEY, of the city, county, and State of New York, have invented, made, and applied to use certain new and useful Improvements in Seats or Settees for Schools, Churches, and other Places; and I do hereby declare that the following is a full, clear, and exact description of the construction and operation of the same, reference being had to the annexed drawing, making part of this specification, wherein—

Figure 1, is a side elevation with the seat shut up, and Fig. 2, is a cross section with the seat turned down ready for use.

Similar marks of reference denote the same parts.

In many of the public schools, churches and other buildings settees are placed around the rooms for use when the main or center seats are full; hence if said seats are permanently fitted in place they are in the way when clearing up, sweeping, or when the scholars or audience are leaving. To meet these requirements various folding and movable settees or seats have been devised.

The nature of my said invention consists in a folding seat combined with a swinging bracket or support so constructed that the operation of turning the seat up or down retracts or swings out the said bracket, so that in one instance the parts are closed up into a compact and small space as seen in Fig. 1; while in the other the seat is turned down into a position that is both secure and comfortable for use.

In the drawing $a$, $a$, are metallic bearings formed on, or attached to, the leg or other support $b$, which is shown as extended up and receiving the back $c$, of the settee.

$d$, is the seat provided with one or more hinges $e$, $e$, that turn in eyes $l$, $l$, on the heads of the vertical bars $f$, $f$, that pass through the bearings $a$, $a$.

$g$, $g$, are brackets having eyes around the bars $f$, $f$, above the bearings $a$, $a$.

$h$, $h$, are miter segments on the hinges $e$, $e$, that take the miter segments or wheels $i$, $i$, on the brackets $g$, $g$, so that as the seat is turned up the brackets are swung inward to be entirely out of the way, and as the seat is turned down the brackets are swung out and receive the seat upon their upper edges.

In case the seat is wanted to be elevated the same can be done by drawing the pin 2, out of each bar $f$, when the bracket seat and bar can be lifted and the pin 2 inserted in a hole 3 in the lower bearing $a$, so that the bar $f$ is sustained thereby.

The size and ornamental shape of the parts may be varied according to the seat or settee to which they are applied.

What I claim as my invention and desire to secure by Letters Patent is—

The combination of the swinging bracket $g$ with the turning seat $d$, connected and acting in the manner and for the purposes specified.

In witness whereof I have hereunto set my signature this twenty third day of April, 1859.

CHARLES PERLEY.

Witnesses:
LEMUEL W. SERRELL,
THOMAS G. HAROLD.